United States Patent [19]
Stine

[11] Patent Number: 5,526,711
[45] Date of Patent: Jun. 18, 1996

[54] COMPOUND TRANSMISSION HAVING DEEP REDUCTION AUXILIARY SECTION GEAR

[75] Inventor: Alan C. Stine, Kalamazoo, Mich.

[73] Assignee: Eaton Corporation, Cleveland, Ohio

[21] Appl. No.: 389,065

[22] Filed: Feb. 14, 1995

Related U.S. Application Data

[63] Continuation of Ser. No. 62,000, May 14, 1993, abandoned.

[51] Int. Cl.$^6$ ........................................ F16H 3/08
[52] U.S. Cl. ........................................ 74/331
[58] Field of Search ........................ 74/331, 333, 357, 74/745

[56] References Cited

U.S. PATENT DOCUMENTS

| | | |
|---|---|---|
| 2,637,221 | 5/1953 | Backus . |
| 2,637,222 | 5/1953 | Backus . |
| 3,105,395 | 10/1963 | Perkins . |
| 3,283,613 | 11/1966 | Perkins . |
| 3,335,616 | 8/1967 | Perkins . |
| 3,648,546 | 3/1972 | McNamara et al. . |
| 3,799,002 | 3/1974 | Richards . |
| 4,290,515 | 9/1981 | Bogema et al. . |
| 4,440,037 | 4/1984 | Foxton et al. . |
| 4,527,447 | 7/1985 | Richards . |
| 4,788,889 | 12/1988 | Davis et al. ........................ 74/331 |
| 4,901,600 | 2/1990 | Wilson . |
| 5,000,060 | 3/1991 | Reynolds et al. . |

*Primary Examiner*—F. Daniel Lopez
*Attorney, Agent, or Firm*—Brooks & Kushman

[57] ABSTRACT

A compound transmission comprising a main section and an auxiliary section is disclosed. The auxiliary section includes an auxiliary drive gear rotatably mounted on an input shaft, and a reduction set including a splitter gear and a deep reduction gear rotatably mounted on an output shaft. Each of the auxiliary section gears is engaged with a corresponding auxiliary countershaft gear. A first clutch rotatable with the input shaft couples either the auxiliary drive gear or the splitter gear to the input shaft. A second clutch rotatable with the output shaft couples either the splitter gear or the deep reduction gear to the output shaft. One of the four main section forward gears may be clutched in from either of two sides to give a ten forward speed compound transmission which uses a standard 5-speed shift pattern.

18 Claims, 3 Drawing Sheets

COMPOUND TRANSMISSION HAVING DEEP REDUCTION AUXILIARY SECTION GEAR

This is a continuation of application Ser. No. 08/062,000 filed on May 14, 1993, now abandoned.

TECHNICAL FIELD

The present invention relates to compound transmissions including a multispeed main transmission section connected in series with a multispeed auxiliary transmission section, and in particular to such a compound transmission having an auxiliary transmission section with a splitter gear and a deep reduction gear.

BACKGROUND ART

Compound change gear transmissions of the type having one or more auxiliary sections connected in series with a main transmission section are known in the prior art. Briefly, by utilizing main and auxiliary transmission sections connected in series, assuming proper sizing of the ratio steps, the total of available transmission ratios is equal to the product of the main and auxiliary section ratios. By way of example, a compound change gear transmission comprising a four (4) speed main section connected in series with a three (3) speed auxiliary section will theoretically provide twelve (4×3=12) available ratios.

Auxiliary transmission sections are of three general types: range type, splitter type or combined range/splitter type. In compound transmission having a range type auxiliary section, the ratio step or steps are greater than the total ratio coverage of the main transmission section and the main section is shifted progressively through its ratios in each range. Examples of compound transmissions having range type auxiliary sections may be seen by reference to U.S. Pat. No. 3,105,395; U.S. Pat. No. 2,637,222; and U.S. Pat. No. 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having splitter type auxiliary sections may be seen by reference to U.S. Pat. No. 4,290,515; U.S. Pat. No. 3,799,002; U.S. Pat. No. 4,440,037; and U.S. Pat. No. 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing the main section ratios to be split in at least one range.

Examples of a compound transmission having a single combined range/splitter type auxiliary section may be seen by reference to U.S. Pat. No. 3,283,613 and U.S. Pat. No. 3,648,546, the disclosures of which are hereby incorporated by reference. Eaton also produces the "Super 10" compound transmission which has a 2+1 main section and an auxiliary section having both range and splitter gears. All three forward ratios are used in the low range, while two forward ratios are repeated in the high range. This results in a standard 5 speed shift pattern.

Another example of a combined range and splitter type compound transmission is the "Ecosplit" model of transmission sold by Zahnradfabrik Friedrichshafen Aktiengeseushaft of Friedrichshafen, Germany, which utilizes a separate splitter auxiliary section in front of, and a separate range auxiliary section behind, the main transmission section. Still another example is the RMO-13-145A thirteen speed transmission sold by Rockwell Corporation, in which the high range forward ratios are split.

It should be noted that the terms main and auxiliary section are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forward speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

SUMMARY OF THE INVENTION

The present invention is a compound transmission comprising a main section and an auxiliary section. The main section includes a plurality of forward gears and a reverse gear. A plurality of main section clutches selectively clutch the gears to a mainshaft to establish a reduction ratio between an input shaft and the mainshaft, with one of the main section gears being clutchable by either of two clutches situated on opposite side of one of the forward gears. The auxiliary section includes an auxiliary drive gear rotatably mounted on the mainshaft, and an output shaft having a splitter gear surrounding and generally coaxial therewith and a deep reduction gear rotatably mounted thereon. Each of the auxiliary section gears is rotatably engaged with a corresponding auxiliary countershaft gear. A first splitter clutch rotatable with the auxiliary section input shaft selectively clutches the auxiliary drive gear or the splitter gear to the auxiliary section input shaft, and a second clutch rotatable with the output shaft selectively clutches the splitter gear or the deep reduction gear to the output shaft.

Accordingly, it is an object of the present invention to provide a new and improved compound transmission having a three layer, four-speed auxiliary transmission section including a splitter gear and a deep reduction gear.

This and other objects and advantages of the present invention will become apparent from a reading of the detailed description of the preferred embodiment taken in connection with the drawings.

DESCRIPTION OF THE PREFERRED EMBODIMENT

Figure 1:
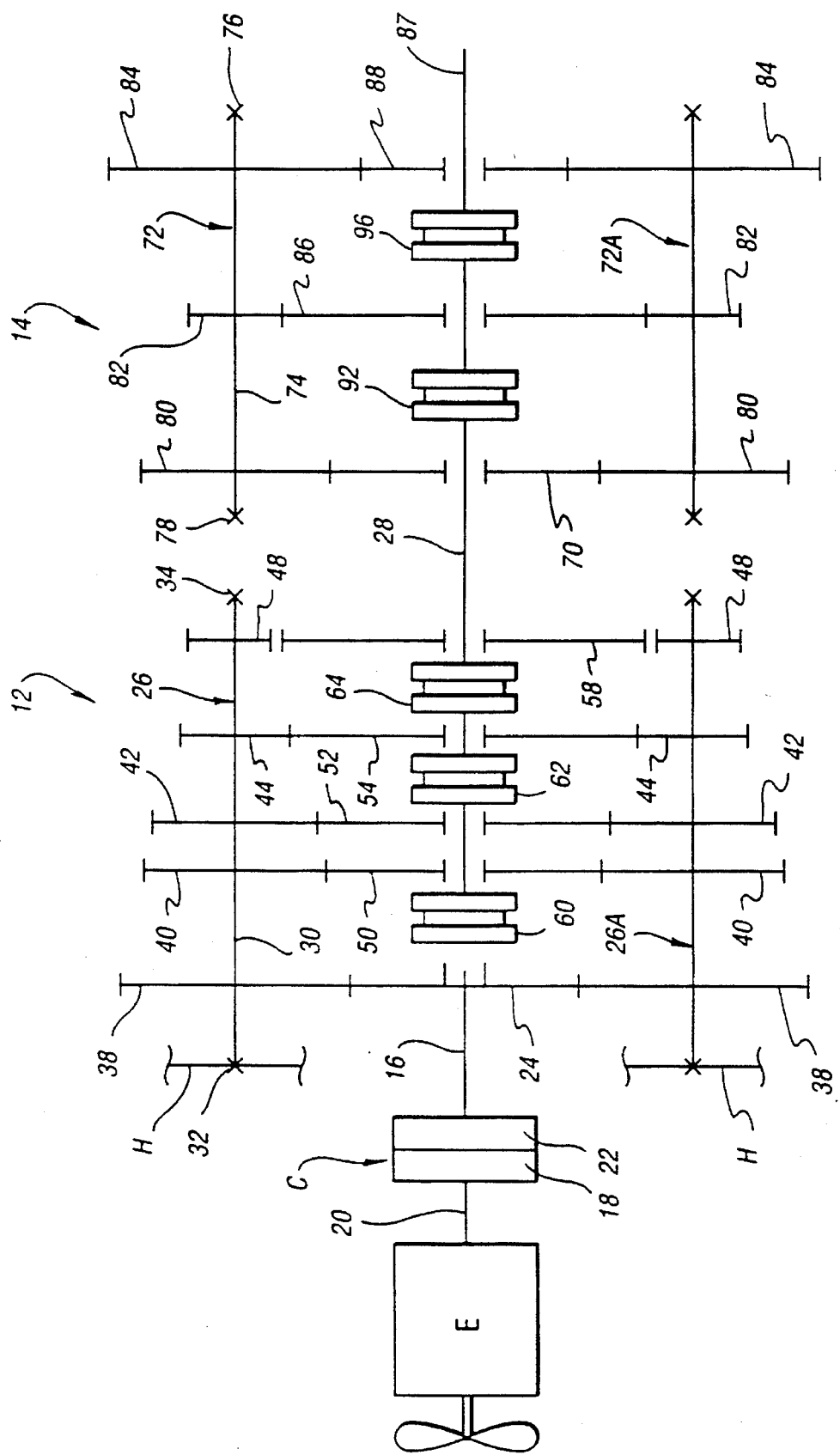
FIG. 1 is a schematic illustration of a compound transmission having an auxiliary section with a splitter gear and a deep reduction gear.

Certain terminology will be used in the following description for convenience in reference only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. Relatively large capacity friction means are utilized with the clutch members and are sufficient, upon initiation of a clutch engagement, to cause the clutch members and all members rotating therewith to rotate at substantially synchronous speed.

Figure 2:
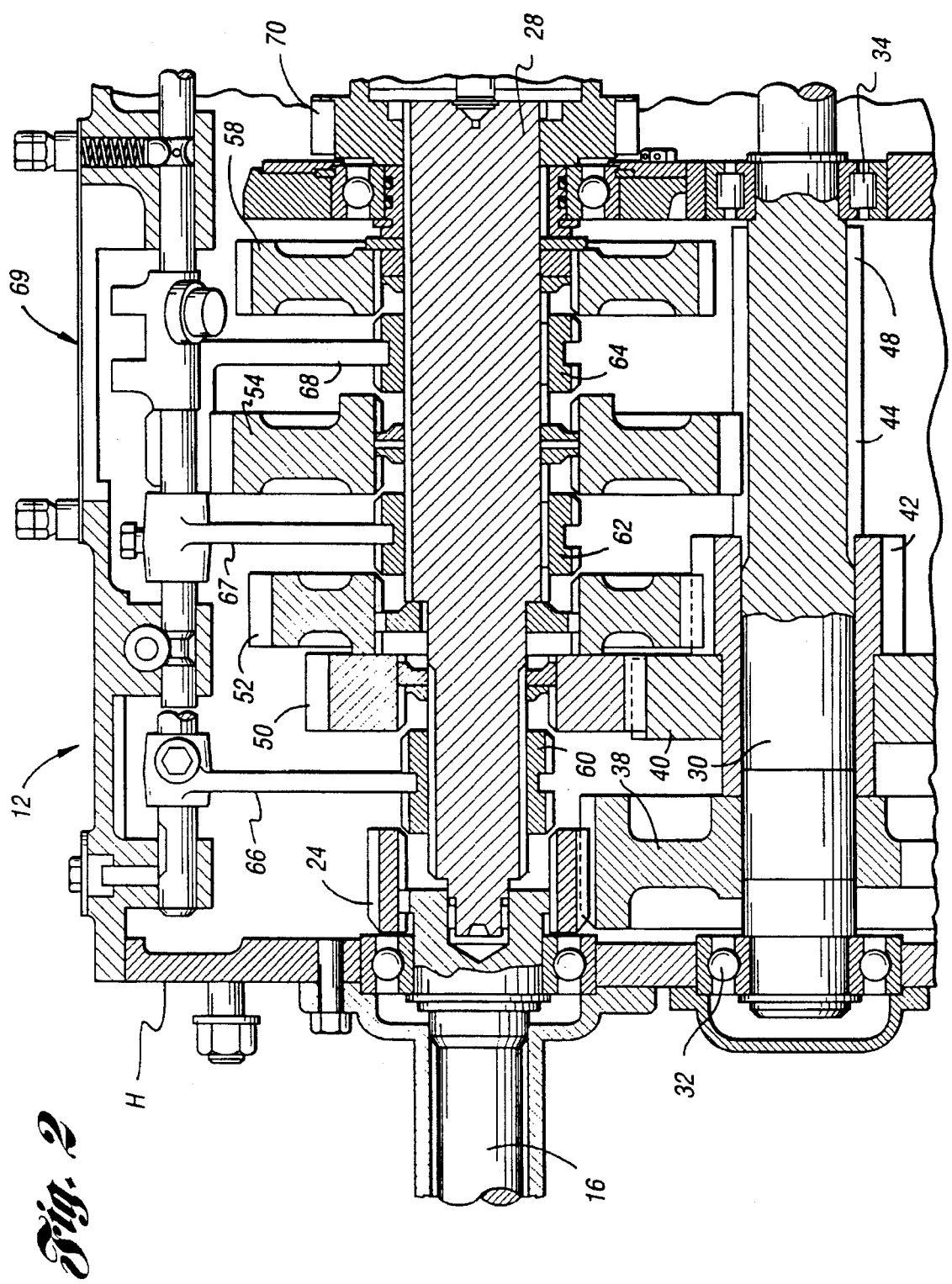
FIG. 2 is a partial sectional view of the transmission of FIG. 1.

FIGS. 1 and 2 show a ten speed compound transmission 10 according to the present invention. Compound transmission 10 comprises a multiple speed main transmission section 12 connected in series with an auxiliary transmission section 14. Typically, transmission 10 is housed within a single housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of countershaft assemblies at substantially identical rotational speeds. In the transmission 10 illustrated, two substantially identical main section countershaft assemblies 26 and 26A are provided on opposite sides of mainshaft 28, which is generally coaxially aligned with the input shaft 16. Each of the main section countershaft assemblies 26 and 26A comprises a main section countershaft 30 supported by bearings 32 and 34 in housing H, only a portion of which is schematically illustrated. Each of the main section countershafts 30 is provided with an identical grouping of main section countershaft gears 38, 40, 42, 44 and 48 fixed for rotation therewith.

A plurality of main section drive or mainshaft gears 50, 52, 54, and 58 surround the mainshaft 28 and are selectively clutchable, one at a time, to the mainshaft 28 for rotation therewith by sliding clutch collars 60, 62 and 64 as is well known in the art. Clutch collar 60 may also be utilized to clutch input gear 24 to mainshaft 28 to provide a direct drive relationship between input shaft 16 and mainshaft 28. Preferably, each of the main section mainshaft gears encircles the mainshaft 28 and is in continuous meshing engagement with and is floatingly supported by the associated countershaft gear group, which mounting means and special advantages resulting therefrom are explained in greater detail in U.S. Pat. No. 3,105,395 and U.S. Pat. No. 3,335,616, the disclosures of which are hereby incorporated by reference.

As shown in FIG. 2, clutch collars 60, 62 and 64 are axially positioned by means of shift yokes or forks 66, 67 and 68, respectively. The shift forks are associated with a shift bar housing assembly 69, for example as described in U.S. Pat. No. 4,901,600, assigned to the assignee of the present invention and hereby incorporated by reference. Clutch collars 60, 62 and 64 are, in the preferred embodiment, of the well known nonsynchronized double acting jaw clutch type. Jaw clutches 60, 62 and 64 are three-position clutches in that they may be positioned in a centered axially nondisplaced, nonengaged position as illustrated, or in a fully rightwardly engaged or fully leftwardly engaged position by means of the shift levers 66, 67 and 68. As is well known, only one of the clutches 60, 62 and 64 is engageable at a given time and main section interlock means are provided to lock the other clutches in the neutral condition.

Although the present invention is illustrated as a multiple identical countershaft, floating mainshaft and floating mainshaft gear type, and while the auxiliary transmission section of the present invention is particularly well suited for such transmission structure, the advantages of the present invention are equally applicable to transmission of the single countershaft or non-identical multiple countershaft type.

Main transmission section 12 provides four selectable forward speed ratios. The first and lowest forward speed ratio is provided by drivingly connecting mainshaft drive gear 54 to mainshaft 28. As shown particularly in FIG. 2, the first speed ratio provided by drivingly connecting the gear 54 to the mainshaft 28 is obtainable either by axially positioning the clutch 64 to the left, or by axially positioning the clutch 62 to the right. Thus, a double entry first gear is provided. The other three forward ratios, in descending order of reduction ratio provided, are obtained by drivingly connecting mainshaft gears 52, 50 or 24 to the mainshaft 28. Main section mainshaft gear 58 is the reverse gear and is in continuous meshing engagement with countershaft gears 48 by means of conventional intermediate idler gears (not shown).

Auxiliary transmission section 14 is connected in series with main transmission section 12. Mainshaft 28 extends into the auxiliary section 14 and carries an auxiliary drive gear 70. The auxiliary drive gear 70 may be fixed to the mainshaft 28, as described below, to simultaneously drive two substantially identical auxiliary section countershaft assemblies 72 and 72A at equal rotational speeds. Each of the auxiliary countershaft assemblies 72 and 72A comprises an auxiliary countershaft 74 supported by bearings 76 and 78 in housing H and carrying three auxiliary section countershaft gears 80, 82 and 84 for rotation therewith.

Auxiliary section countershaft gears 80 are constantly meshed with and support auxiliary section auxiliary drive gear 70. Auxiliary section countershaft gears 82 are constantly meshed with and support an auxiliary section splitter gear 86 which surrounds output shaft 87 at the end thereof adjacent the coaxial end of mainshaft 28. Alternatively, the mainshaft 28 can extend through the splitter gear 86 so that the splitter gear 86 surrounds the end of mainshaft. Auxiliary section countershaft gears 84 constantly mesh with and support an auxiliary section deep reduction gear 88, which surrounds the output shaft 87. Accordingly, auxiliary section countershaft gears 80 and auxiliary drive gear 70 define a first gear layer, auxiliary section countershaft gears 82 and splitter gear 86 define a second gear layer, and auxiliary section countershaft gears 84 and deep reduction gear 88 define a third layer, or gear group, of the auxiliary transmission section 14. The rearmost gears 84 and 88 constitute a reduction set.

A sliding two position jaw clutch collar 92 is splined on the extension of the mainshaft 28 for rotation therewith. Clutch assembly 92 may be selectively located in a leftwardmost axial position to drivingly couple the auxiliary drive gear 70 to the mainshaft 28, or may be selectively located in a rightwardmost position to drivingly couple splitter gear 86 to the mainshaft 28. Typically, clutch assembly 92 is axially positioned by means of a shift fork controlled by a remotely controlled fluid actuated piston assembly. The piston assembly is operable by a driver selection switch such as a button or the like on the shift knob, for example as described in U.S. Patent No. 5,000,060, assigned to the assignee of the present invention and hereby incorporated by reference. The structure and function of the double acting sliding jaw clutch collar 92 is substantially identical to the structure and function of jaw clutch collars 60, 62 and 64 utilized in the main transmission section 12.

A sliding two position jaw clutch collar 96 is similarly splined to and carried on the output shaft 87. Clutch collar 96 may be selectively located in the leftwardmost axial position to rotationally couple the splitter gear 86 to the output shaft 87, or may be selectively positioned in the rightwardmost axial position to rotationally couple the deep reduction gear 88 to the output shaft.

Figure 3:
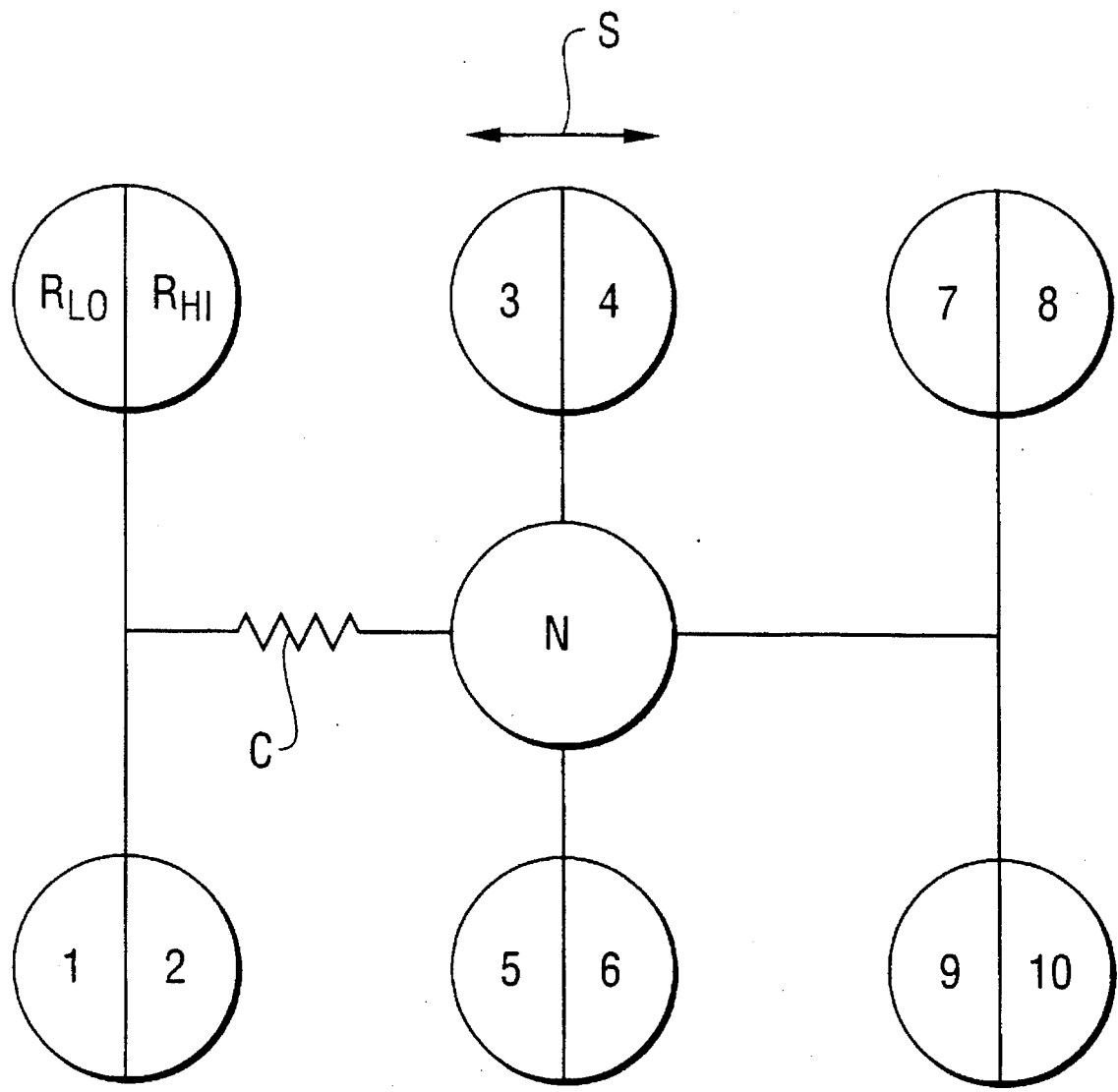
FIG. 3 is a schematic illustration of a shift pattern for the compound transmission.

FIG. 3 shows the shift pattern for shifting the ten speed compound transmission 10. Divisions in the horizontal direction represented by arrow S represent splitter shifts, while movement by the operator of a gearshift lever between the lower left position and the upper middle position causes the mainshaft gear 58 to be clutched to the mainshaft by clutch 62 instead of clutch 64. This movement also causes the clutch 96 to move from engagement with the deep reduction gear 88 and into engagement with the splitter gear 86. This automatic range change is represented by the oscillating line C.

All of the six shift pattern positions provide two selectable ratios, including the reverse gear position. In the leftwardmore shift pattern positions, the clutch 92 couples the mainshaft 28 to the splitter gear 86. In the rightwardmore shift pattern positions, the clutch 92 couples the mainshaft 28 to the auxiliary drive gear 70.

The lower left shift pattern position provides the lowest forward speed gear. Because the first speed gear 54 is used in both low and high range, the shift pattern for the compound transmission 10 has the same configuration as a standard 5 speed, non-repeat, autorange shift pattern.

Disregarding the reverse ratio, it is desirable that the main section ratio steps be generally equal, and the splitter steps be generally equal to the square root of the main section ratio steps. Given these desired ideal ratios, gearing to approximate these ratios is selected. A preferred embodiment of the present invention provides the following relationships:

| Gear | # Teeth | Set Ratio | Overall Ratio | % Step |
|---|---|---|---|---|
| 24 (Drive) | 42 | 1.7380 | 1 | |
| 38 | 73 | | | 83.6 |
| 50 (3rd) | 56 | 1.0566 | 1.8364 | |
| 40 | 53 | | | 83.4 |
| 52 (2nd) | 62 | 1.9375 | 3.3675 | |
| 42 | 32 | | | 84.3 |
| 54 (1st) | 50 | 3.5714 | 6.2074 | |
| 44 | 14 | | | |
| 58 (Rev) | 50 | 3.5714 | 6.2074 | |
| 48 | 14 | | | |
| 70 (Aux Drive) | 42 | 0.8809 | 0.7277 | |
| 80 | 37 | | | 37.4 |
| 86 (1st Split) | 38 | 1.2105 | 1 | |
| 82 | 46 | | | |
| 88 (Deep Red.) | 50 | 1.5625 | 1.3764 | |
| 84 | 32 | | | 37.4 |
| | | | 1.8914 | |

The compound transmission 10 thus provides ten forward speeds and two reverse speed as indicated in the chart below:

| Gear Name | Ratio | Overall Ratio | % Step |
|---|---|---|---|
| 1 | 11.74 | 16.133 | — |
| 2 | 8.544 | 11.741 | 37.4 |
| 3 | 6.207 | 8.5297 | 37.6 |
| 4 | 4.517 | 6.2074 | 37.4 |
| 5 | 3.367 | 4.6274 | 34.1 |
| 6 | 2.450 | 3.3675 | 37.4 |
| 7 | 1.836 | 2.5235 | 33.4 |
| 8 | 1.336 | 1.8364 | 37.4 |
| 9 | 1 | 1.3741 | 33.6 |
| 10 | 0.727 | 1 | 37.4 |
| Rev-Low | 11.74 | 16.133 | |
| Rev-High | 8.23 | 11.308 | |

Although the present invention has been set forth with a certain degree of particularity, it is understood that various modifications are possible without departing from the spirit and the scope of the invention as hereinafter claimed.

What is claimed is:

1. A compound transmission comprising:

a main section including:

an input shaft having an input gear rotationally fixed thereto, a mainshaft having first and second forward gears and a reverse gear rotatably mounted thereon, at least one countershaft drivable by the input gear, the countershaft having first and second countershaft gears rotatable with the countershaft and rotatably engaged with the first and second forward gears, respectively, the countershaft also having a third countershaft gear rotatable with the countershaft and rotatably engaged with the reverse gear, a first clutch collar rotatable with the mainshaft and adapted to clutch the reverse gear or the first forward gear to the mainshaft, a second clutch collar rotatable with the mainshaft and adapted to clutch the first forward gear or the second forward gear to the mainshaft, and a third clutch collar rotatable with the mainshaft and adapted to clutch the input gear to the mainshaft; and an auxiliary section including:

an auxiliary section input shaft driven by the mainshaft, the input shaft having an auxiliary drive gear rotatably mounted thereon, an output shaft having a splitter gear surrounding and generally coaxial therewith and a deep reduction gear rotatably mounted thereon, at least one countershaft having first, second and third auxiliary countershaft gears rotatable with the auxiliary countershaft and rotatably engaged with the auxiliary drive gear, splitter gear, and deep reduction gear, respectively, a fourth clutch collar rotatable with the auxiliary section input shaft for selectively clutching the auxiliary drive gear or the splitter gear to the auxiliary section input shaft, and a fifth clutch collar rotatable with the output shaft for selectively clutching the splitter gear or the deep reduction gear to the output shaft.

2. The compound transmission of claim 1 further comprising a third forward gear rotatably mounted on the mainshaft, the third clutch collar being adapted to clutch the third forward gear or the main section input gear to the mainshaft.

3. The compound transmission of claim 2 wherein the main transmission section provides four forward speed ratios.

4. The compound transmission of claim 1 wherein the first forward gear provides a reduction ratio between the main section input shaft and the mainshaft greater than the reduction ratio provided by the second forward gear.

5. The compound transmission of claim 1 wherein the deep reduction gear is coupled to the output shaft to provide low range ratios.

6. The compound transmission of claim 1 wherein the auxiliary section input shaft comprises the mainshaft of the main section.

7. The compound transmission of claim 6 wherein the mainshaft is generally coaxial with the auxiliary section output shaft.

8. The compound transmission of claim 1 wherein the fourth clutch collar is disposed between the auxiliary drive gear and the splitter gear.

9. A compound transmission comprising:

a main section including:

an input shaft having an input gear rotationally fixed thereto, a mainshaft having first and second forward gears and a reverse gear rotatably mounted thereon, at least one countershaft drivable by the input gear, the countershaft having first and second countershaft gears rotatable with the countershaft and rotatably engaged with the first and second forward gears, respectively, the countershaft also having a third countershaft gear rotatable with the countershaft and rotatably engaged with the reverse gear, a first clutch collar rotatable with the mainshaft and adapted to clutch the reverse gear or the first forward gear to the mainshaft, a second clutch collar rotatable with the mainshaft and adapted to clutch the first forward gear or the second forward gear to the mainshaft, and a third clutch collar rotatable with the mainshaft and adapted to clutch the input gear to the mainshaft; and an auxiliary section including:

an auxiliary section input shaft driven by the mainshaft, the input shaft having an auxiliary drive gear and a splitter gear rotatably mounted thereon, an output shaft having a deep reduction gear rotatably mounted thereon, at least one countershaft having first, second and third auxiliary countershaft gears rotatable with the auxiliary countershaft and rotatably engaged with the auxiliary drive gear, splitter gear, and deep reduction gear, respectively, a fourth clutch collar rotatable with the auxiliary section input shaft for selectively clutching the auxiliary drive gear or the splitter gear to the auxiliary section input shaft, and a fifth clutch collar rotatable with the output shaft for selectively clutching the splitter gear or the deep reduction gear to the output shaft.

10. The compound transmission of claim 9 further comprising a third forward gear rotatably mounted on the mainshaft, the third clutch collar being adapted to clutch the third forward gear or the main section input gear to the mainshaft.

11. The compound transmission of claim 10 wherein the main transmission section provides four forward speed ratios.

12. The compound transmission of claim 9 wherein the first forward gear provides a reduction ratio between the main section input shaft and the mainshaft greater than the reduction ratio provided by the second forward gear.

13. The compound transmission of claim 9 wherein the deep reduction gear is coupled to the output shaft to provide low range ratios.

14. The compound transmission of claim 9 wherein the auxiliary section input shaft comprises the mainshaft of the main section.

15. The compound transmission of claim 14 wherein the mainshaft is generally coaxial with the auxiliary section output shaft.

16. The compound transmission of claim 9 wherein the fourth clutch collar is disposed between the auxiliary drive gear and the splitter gear.

17. A compound transmission comprising:

a housing defining a multiple speed main section connected in series with a multiple speed auxiliary section;

the main section including:

an input shaft having an input gear rotationally fixed thereto, a mainshaft having first and second and third forward gears and a reverse gear surrounding but not constantly engaged with the mainshaft, at least one countershaft rotationally supported in the housing and drivable by the input gear, the countershaft having a plurality of countershaft gears rotatationally fixed to the countershaft and rotatably engaged with a corresponding mainshaft gear, and a first clutch collar rotatable with the mainshaft for clutching the reverse gear or the first forward gear to the mainshaft, a second clutch collar rotatable with the mainshaft for clutching the first forward gear or the second forward gear to the mainshaft, and a third clutch collar rotatable with the mainshaft for clutching the third forward gear or the input gear to the mainshaft; and the auxiliary section including:

an auxiliary drive gear coaxial with and rotatable relative to the mainshaft, an output shaft having a splitter gear and a deep reduction gear generally coaxial with and rotatable relative to the output shaft, a pair of auxiliary countershafts rotationally supported in the housing and drivable by the auxiliary drive gear, each auxiliary countershaft having first, second and third auxiliary countershaft gears rotationally fixed thereto and rotatably engaged with the auxiliary drive gear, the splitter gear, and the deep reduction gear, respectively, a first auxiliary section splitter clutch collar for selectively clutching the auxiliary drive gear or the splitter gear to the mainshaft, and a second auxiliary section clutch collar for selectively clutching the splitter gear or the deep reduction gear to the output shaft.

18. The compound transmission of claim 7 wherein the first auxiliary section splitter clutch collar is disposed between the auxiliary drive gear and the splitter gear.

* * * * *

UNITED STATES PATENT AND TRADEMARK OFFICE
CERTIFICATE OF CORRECTION

PATENT NO. : 5,526,711
DATED : June 18, 1996
INVENTOR(S) : Alan C. Stine

It is certified that error appears in the above-indentified patent and that said Letters Patent is hereby corrected as shown below:

Column 3, Line 10 "respectfully" should read --respectively--.
Column 6, Line 21 "speed" should be plural --speeds--.

Signed and Sealed this

Fifteenth Day of April, 1997

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,526,711
DATED : June 18, 1996
INVENTOR(S) : Alan C. Stine

It is certified that error appears in the above-indentified patent and that said Letters Patent is hereby corrected as shown below:

In FIGURE 1 shaft 28 should be separated from shaft 87 between clutch collar 92 and gear 86.

Signed and Sealed this

Eighth Day of July, 1997

Attest:

BRUCE LEHMAN

Attesting Officer

Commissioner of Patents and Trademarks